United States Patent
Gee et al.

(10) Patent No.: US 11,372,092 B2
(45) Date of Patent: Jun. 28, 2022

(54) HYBRID ULTRASOUND TRANSMITTER

(71) Applicant: Shenzhen Mindray Bio-Medical Electronics Co., Ltd., Shenzhen (CN)

(72) Inventors: Albert Gee, Los Altos, CA (US); Glen W. McLaughlin, San Carlos, CA (US)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 679 days.

(21) Appl. No.: 16/240,598

(22) Filed: Jan. 4, 2019

(65) Prior Publication Data
US 2020/0217939 A1 Jul. 9, 2020

(51) Int. Cl.
| | |
|---|---|
| *G01S 7/00* | (2006.01) |
| *G01S 7/52* | (2006.01) |
| *G08C 23/02* | (2006.01) |
| *G01S 15/89* | (2006.01) |
| *H04B 1/04* | (2006.01) |

(52) U.S. Cl.
CPC ........ *G01S 7/5202* (2013.01); *G01S 15/8979* (2013.01); *G08C 23/02* (2013.01); *H04B 1/04* (2013.01)

(58) Field of Classification Search
USPC .......................................................... 367/138
See application file for complete search history.

(56) References Cited

U.S. PATENT DOCUMENTS

| | | | | |
|---|---|---|---|---|
| 4,079,352 | A * | 3/1978 | Burckhardt | G10K 11/346 367/93 |
| 4,254,662 | A * | 3/1981 | Kuroda | G01N 29/262 73/626 |
| 4,372,323 | A * | 2/1983 | Takemura | A61B 8/08 600/447 |
| 4,541,281 | A * | 9/1985 | Chubachi | G01H 3/125 73/602 |
| 5,063,541 | A * | 11/1991 | Kondo | G10K 11/341 367/7 |
| 5,211,176 | A * | 5/1993 | Ishiguro | A61B 8/12 600/445 |
| 5,754,676 | A * | 5/1998 | Komiya | G06K 9/6217 382/132 |
| 6,524,254 | B2 * | 2/2003 | Erikson | A61B 8/4483 257/E27.006 |
| 9,871,530 | B1 * | 1/2018 | La Grou | H03M 1/188 |

(Continued)

*Primary Examiner* — James R Hulka
(74) *Attorney, Agent, or Firm* — Kory D. Christensen

(57) ABSTRACT

Systems and methods for utilizing a hybrid transmitter in an ultrasound system. A system can include a hybrid transmitter configured to transmit ultrasound waves toward a subject area. The hybrid transmitter can comprise a linear transmitter configured to generate linear transmitter output and a switching transmitter configured to generate switching transmitter output. The hybrid transmitter can also comprise a summer configured to sum the linear transmitter output and the switching transmitter output to generate hybrid transmitter output for driving a transducer load to generate the ultrasound waves transmitted towards the subject area. The ultrasound system can also comprise a receiver configured to receive one or more ultrasound waves from the subject area in response to the ultrasound waves transmitted toward the subject area for generating ultrasound images of the subject area.

17 Claims, 19 Drawing Sheets

(56) References Cited

U.S. PATENT DOCUMENTS

| | | | | |
|---|---|---|---|---|
| 2003/0018260 A1* | 1/2003 | Erikson | B06B 1/0622 | 600/447 |
| 2003/0060709 A1* | 3/2003 | Hashimoto | B06B 1/0215 | 600/443 |
| 2003/0199756 A1* | 10/2003 | Kawashima | A61B 8/12 | 600/424 |
| 2004/0254459 A1* | 12/2004 | Kristoffersen | B06B 1/0215 | 600/437 |
| 2005/0096541 A1* | 5/2005 | Fukuda | A61B 8/0858 | 600/437 |
| 2008/0125656 A1* | 5/2008 | Yao | G01S 7/52095 | 600/447 |
| 2011/0301878 A1* | 12/2011 | Romanov | G01F 1/667 | 702/48 |
| 2015/0032002 A1* | 1/2015 | Rothberg | A61B 8/4483 | 600/440 |
| 2015/0080724 A1* | 3/2015 | Rothberg | G03B 27/52 | 600/439 |
| 2016/0290847 A1* | 10/2016 | Gronsberg | G01F 1/663 | |
| 2017/0143306 A1* | 5/2017 | Rothberg | A61B 8/4444 | |
| 2017/0258443 A1* | 9/2017 | Rothberg | A61B 8/13 | |
| 2018/0214123 A1* | 8/2018 | Takano | G01S 7/5202 | |
| 2019/0117196 A1* | 4/2019 | Choi | A61B 8/56 | |

\* cited by examiner

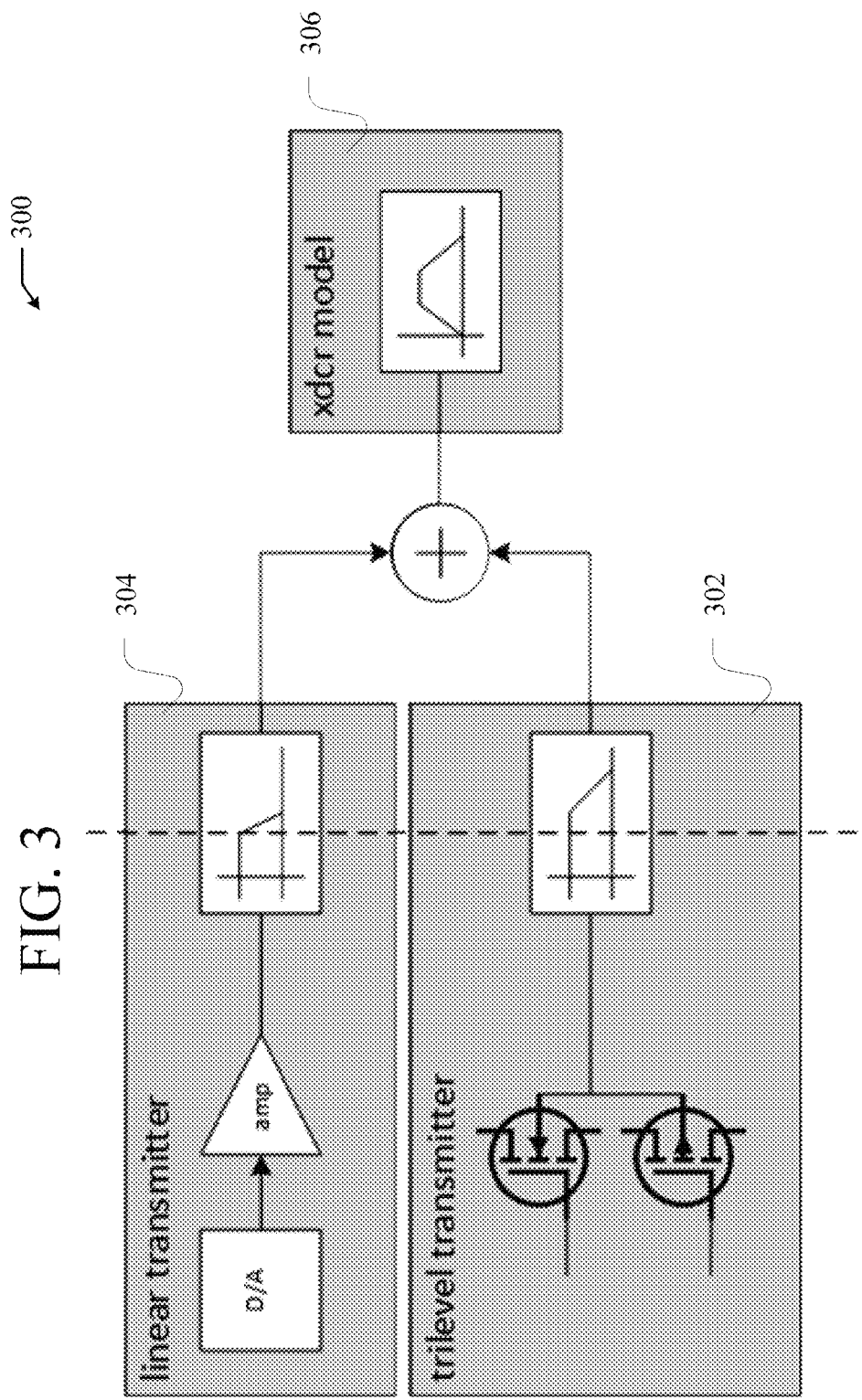

HYBRID ULTRASOUND TRANSMITTER

TECHNICAL FIELD

This disclosure relates to ultrasound hybrid transmitters. Specifically, this disclosure relates to an ultrasound hybrid transmitter with improved bandwidth, improved pulse shaping ability, and improved efficiency in operating in an ultrasound system.

BACKGROUND OF THE INVENTION

Ultrasound systems have the capability of pulse shaping the transmit signal used to excite the transducer. This transmit pulse shaping is often accomplished with a linear transmitter. While the linear transmitter generally has good pulse shaping abilities, it suffers from lower bandwidth and lower efficiency when compared to more conventional switching transmitters. On the other hand, switching transmitters, with their limited number of achievable levels, suffer from coarser pulse shaping ability when compared with linear transmitters. There therefore exist needs for ultrasounds system and methods that include the benefits of pulse shaping provided by linear transmitters while also including the benefits of improved bandwidth and higher efficiency provided by switching transmitters.

Further, ultrasound systems have different requirements when operating in different modes of operation. Specifically, ultrasound systems can be configured to operate optimally in B-Mode while sacrificing operation performance in CD-mode. There therefore exist needs for ultrasound systems and methods that optimize performance of the ultrasound systems according to the specific operation modes of the ultrasound systems.

SUMMARY

In various embodiments, an ultrasound system includes a hybrid transmitter configured to transmit ultrasound waves toward a subject area. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate the ultrasound waves transmitted towards the subject area. The ultrasound system can also include a receiver configured to receive one or more ultrasound waves from the subject area in response to the ultrasound waves transmitted toward the subject area for generating one or more ultrasound images of the subject area.

In certain embodiments, a method includes controlling a linear transmitter of a hybrid transmitter to generate linear transmitter output. The method can also include controlling a switching transmitter of the hybrid transmitter to generate switching transmitter output. Further, the method can include summing the linear transmitter output and the switching transmitter output to generate hybrid transmitter output for driving a transducer load to generate ultrasound waves transmitted towards a subject area.

In various embodiments, a method includes identifying a hybrid transmitter operation model for a hybrid transmitter of an ultrasound system. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate ultrasound waves. The method can also include controlling operation of the linear transmitter and the switching transmitter according to the hybrid transmitter operation model to generate desired hybrid transmitter output for driving the transducer load.

In certain embodiments, a method includes identifying an ultrasound imaging mode of an ultrasound system including a hybrid transmitter. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate ultrasound waves. The method can also include controlling operation of the linear transmitter and the switching transmitter according to the ultrasound imaging mode of the ultrasound system.

BRIEF DESCRIPTION OF THE DRAWINGS

FIG. 3 shows an example hybrid transmitter configuration of a hybrid transmitter that is used to empirically create a hybrid transmitter operation model for the hybrid transmitter.

DETAILED DESCRIPTION

Figure 1:
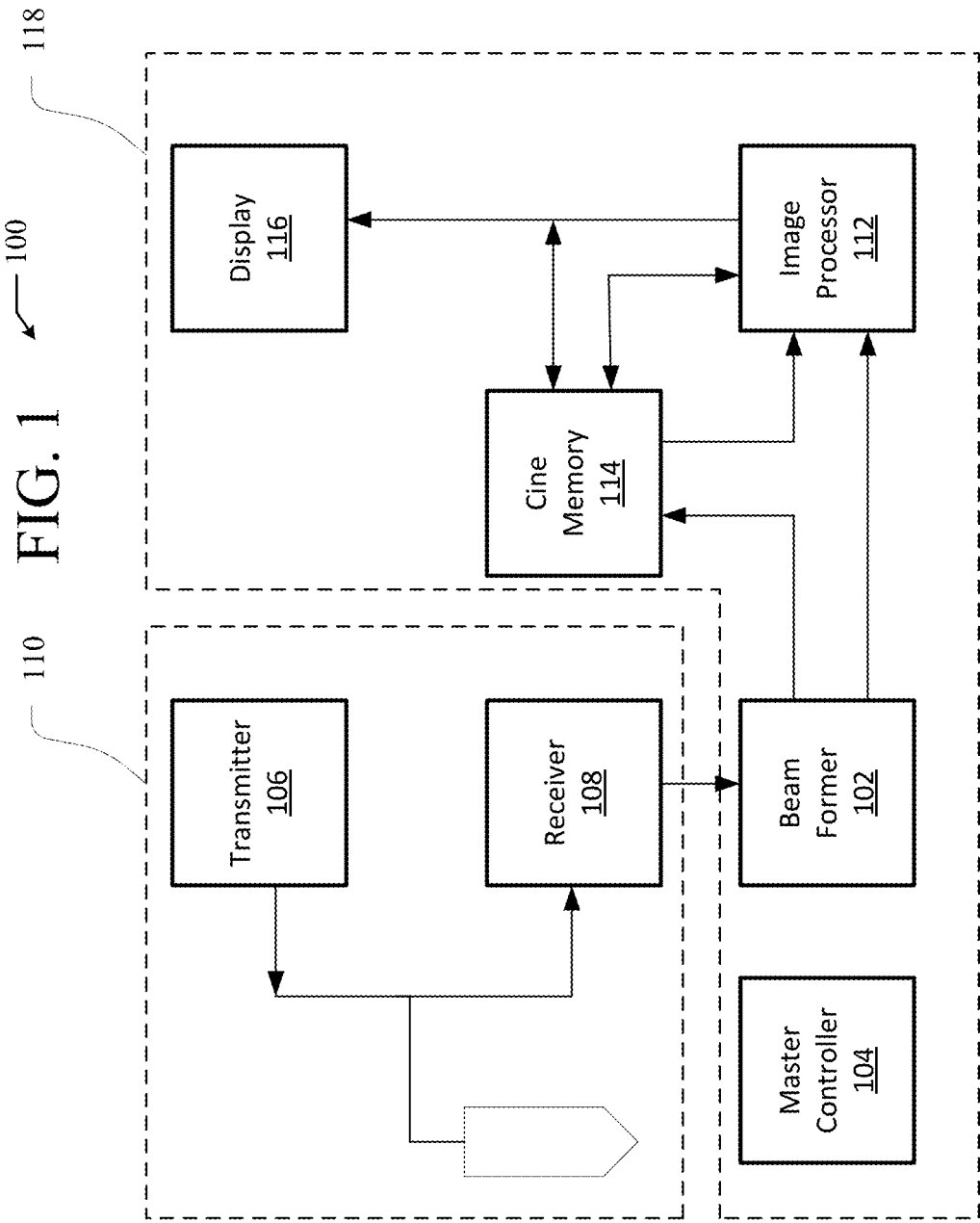
FIG. 1 illustrates an example of an ultrasound system.

The disclosure relates to the need in the art for improved ultrasound transmitters. Specifically, the disclosure relates to systems, methods, and computer-readable media for ultrasound transmitters that include the benefits of pulse shaping provided by linear transmitters while also including the benefits of improved bandwidth and higher efficiency provided by switching transmitters.

Ultrasound machines have the capability of pulse shaping the transmit signal used to excite the transducer. This transmit pulse shaping is often accomplished with a linear transmitter. While linear transmitters generally have good pulse shaping abilities, they suffer from lower bandwidth and lower efficiency when compared to more conventional switching transmitters. On the other hand, switching transmitters, with their limited number of achievable levels, have higher bandwidth and efficiency. However, such switching transmitters suffer from coarser pulse shaping ability when compared with linear transmitters.

The present describes ultrasound systems and methods for operating ultrasound systems that include a hybrid combination of a linear transmitter and a switching transmitter. In turn, this allows the ultrasound systems to utilize a transmitter with increased bandwidth, increased pulse shaping ability, and increased efficiency when compared to a design based solely on either a linear transmitter or a switching transmitter.

Further, ultrasound systems have different requirements when operating in different modes of operation. Specifically, ultrasound systems can be configured to operate optimally in B-Mode while sacrificing operation performance in CD-mode. With respect to the ultrasound systems described herein, an additional benefit of a hybrid transmitter is the mode switching agility it can provide when multiple ultrasound modes are used, potentially simultaneously.

The present describes a hybrid transmitter that utilizes the increased pulse shaping capability of the hybrid transmitter, in conjunction with pulse design techniques, to compensate for deficiencies in analog portions of linear and switching transmitters, as well as the transducer responses. Specifically, ultrasound systems can be configured to operate in different modes of operation using one or more hybrid transmitters while realizing the benefits of a hybrid transmitter that includes a linear transmitter and a switching transmitter.

In various embodiments, an ultrasound system includes a hybrid transmitter configured to transmit ultrasound waves toward a subject area. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate the ultrasound waves transmitted towards the subject area. The ultrasound system can also include a receiver configured to receive one or more ultrasound waves from the subject area in response to the ultrasound waves transmitted toward the subject area for generating one or more ultrasound images of the subject area.

In certain embodiments, a method includes controlling a linear transmitter of a hybrid transmitter to generate linear transmitter output. The method can also include controlling a switching transmitter of the hybrid transmitter to generate switching transmitter output. Further, the method can include summing the linear transmitter output and the switching transmitter output to generate hybrid transmitter output for driving a transducer load to generate ultrasound waves transmitted towards a subject area.

In various embodiments, a method includes identifying a hybrid transmitter operation model for a hybrid transmitter of an ultrasound system. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate ultrasound waves. The method can also include controlling operation of the linear transmitter and the switching transmitter according to the hybrid transmitter operation model to generate desired hybrid transmitter output for driving the transducer load.

In certain embodiments, a method includes identifying an ultrasound imaging mode of an ultrasound system including a hybrid transmitter. The hybrid transmitter can include a linear transmitter configured to generate linear transmitter output. The hybrid transmitter can also include a switching transmitter configured to generate switching transmitter output. Further, the hybrid transmitter can include a summer configured to sum the linear transmitter output and the switching transmitter output to generate hybrid transmitter output for driving a transducer load to generate ultrasound waves. The method can also include controlling operation of the linear transmitter and the switching transmitter according to the ultrasound imaging mode of the ultrasound system.

Some of the infrastructure that can be used with embodiments disclosed herein is already available, such as general-purpose computers, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example of an ultrasound system 100. The ultrasound system 100 shown in FIG. 1 is merely an example system and in various embodiments, the ultrasound system 100 can have less components or additional components. The ultrasound system 100 can be an ultrasound system where the receive array focusing unit is referred to as a beam former 102, and image formation can be performed on a scanline-by-scanline basis. System control can be centered in the master controller 104, which accepts operator inputs through an operator interface and in turn controls the various subsystems. For each scan line, the transmitter 106 generates a radio-frequency (RF) excitation voltage pulse waveform and applies it with appropriate timing across the transmit aperture (defined by a sub-array of active elements) to generate a focused acoustic beam along the scan line. RF echoes received by the receive aperture 108 of the transducer 110 are amplified and filtered by the receiver 108, and then fed into the beam former 102, whose function is to perform dynamic receive focusing; i.e., to re-align the RF signals that originate from the same locations along various scan lines.

The image processor 112 can perform processing specific to active imaging mode(s) including 2D scan conversion that transforms the image data from an acoustic line grid to an X-Y pixel image for display. For Spectral Doppler mode, the image processor 112 can perform wall filtering followed by spectral analysis of Doppler-shifted signal samples using typically a sliding FFT-window. The image processor 112 can also generate the stereo audio signal output corresponding to forward and reverse flow signals. In cooperation with the master controller 104, the image processor 112 also can format images from two or more active imaging modes, including display annotation, graphics overlays and replay of cine loops and recorded timeline data.

The cine buffer 114 provides resident digital image storage for single image or multiple image loop review, and acts as a buffer for transfer of images to digital archival devices. On most systems, the video images at the end of the data processing path can be stored to the cine memory. In state-of-the-art systems, amplitude-detected, beamformed data may also be stored in cine memory 114. For spectral Doppler, wall-filtered, baseband Doppler I/Q data for a user-selected range gate can be stored in cine memory 114. Subsequently, the display 116 can display ultrasound images created by the image processor 112 and/or images using data stored in the cine memory 114.

The beam former 102, the master controller 104, the image processor, the cine memory 114, and the display can be included as part of a main processing console 118 of the ultrasound system 100. In various embodiments, the main processing console 118 can include more or fewer components or subsystems. The ultrasound transducer 110 can be incorporated in an apparatus that is separate from the main processing console 118, e.g. in a separate apparatus that is wired or wirelessly connected to the main processing console 118. This allows for easier manipulation of the ultrasound transducer 110 when performing specific ultrasound procedures on a patient. Further, the transducer 110 can be an array transducer that includes an array of transmitting and receiving elements for transmitting and receiving ultrasound waves.

Figure 2:
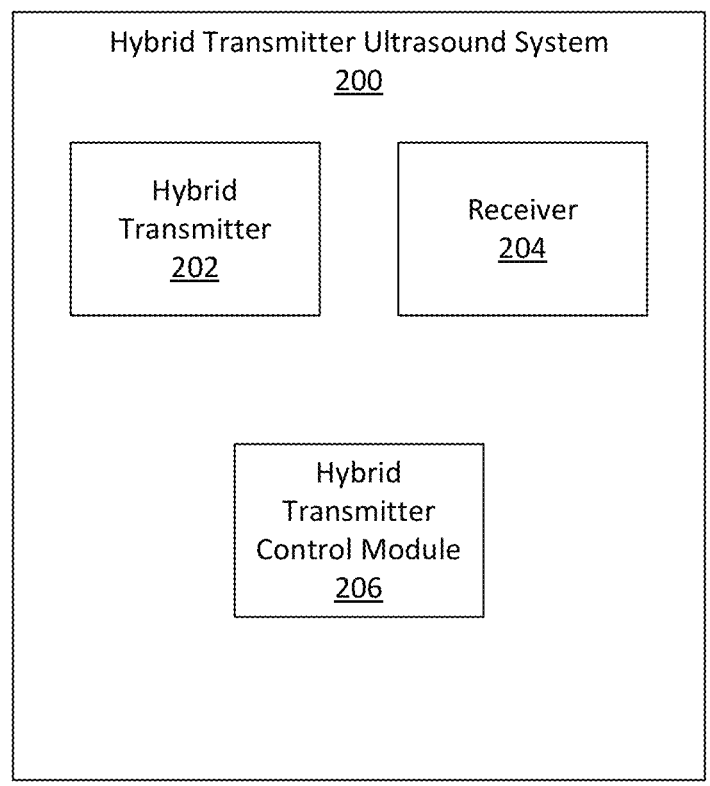
FIG. 2 shows an example hybrid transmitter ultrasound system.

FIG. 2 shows an example hybrid transmitter ultrasound system 200. The hybrid transmitter ultrasound system 200 shown in FIG. 2 can be configured to perform the functionalities of an applicable ultrasound system, such as the ultrasound system 100 shown in FIG. 1. Specifically, the hybrid transmitter ultrasound system 200 can transmit and receive ultrasound waves into and from a subject area for purposes of generating ultrasound images of the subject area. Further, the hybrid transmitter ultrasound system 200 can perform ultrasound processing/ultrasound image processing on received ultrasound waves in order to generate ultrasound images of a subject area. For example, the hybrid transmitter ultrasound system 200 can beamform ultrasound waves received from a subject area for purposes of ultimately generating ultrasound images of the subject area.

The hybrid transmitter ultrasound system 200 includes a hybrid transmitter 202 and a receiver 204. While only a single hybrid transmitter 202 and receiver 204 are shown in the example hybrid transmitter ultrasound system 200, in various embodiments, the hybrid transmitter ultrasound system 200 can include more than one hybrid transmitter 202 and/or more than one receiver 204. Further, the hybrid transmitter 202 and the receiver 204 can be integrated as part of or with an applicable ultrasound transducer, such as the transducer 110 shown in the example ultrasound system 100 shown in FIG. 1.

The hybrid transmitter 202 functions to generate hybrid transmitter output for driving a transducer load to generate ultrasound waves transmitted towards a subject area. The receiver 204 functions to receive ultrasound waves from the subject area in response to ultrasound waves transmitted towards the subject area by the hybrid transmitter 202. Subsequently, the ultrasound waves received from the subject area by the receiver 204 can be used, at least in part, to generate ultrasound images of the subject area.

As will be discussed in greater detail later, the hybrid transmitter can include a linear transmitter, a switching transmitter, and a summer. The linear transmitter is configured to generate linear transmitter output for ultimately generating ultrasound waves to transmit towards a subject area. The switching transmitter is configured to generate switching transmitter output for ultimately generating ultrasound waves to transmit towards a subject area. The summer is configured to sum linear transmitter output of the linear transmitter with switching transmitter output of the switching transmitter to generate hybrid transmitter output. The hybrid transmitter output ultimately generated by the summer can subsequently be used to drive a transducer load to generate ultrasound waves for transmission towards a subject area.

The hybrid transmitter control module 206 is configured to control the hybrid transmitter 202 for generating hybrid transmitter output to drive a transducer load for generating ultrasound waves. Specifically, the hybrid transmitter control module 206 can control either or both a linear transmitter and a switching transmitter of the hybrid transmitter 202 to control generation of hybrid transmitter output. More specifically, the hybrid transmitter control module 206 can turn off either or both a linear transmitter and a switching transmitter to generate hybrid transmitter output. In turning off one of a linear transmitter and a switching transmitter of the hybrid transmitter 202, the output of either the linear transmitter or the switching transmitter is null. A summer of the hybrid transmitter 202 can still sum the null output of the linear transmitter or the switching transmitter with the output of the transmitter that is producing output with an actual value, in order to generate hybrid transmitter output. For example, if the hybrid transmitter control module 206 turns off a linear transmitter, then a summer of the hybrid transmitter 202 can sum the null linear transmitter output with switching transmitter output of a switching transmitter to generate hybrid transmitter output for the hybrid transmitter 202.

Further, the hybrid transmitter control module 206 can control the hybrid transmitter 202 based on an ultrasound imaging mode of the hybrid transmitter ultrasound system 200. An ultrasound imaging mode of the hybrid transmitter ultrasound system 200 can include an applicable imaging mode in which an ultrasound system can generate ultrasound images. For example, an ultrasound imaging mode of the hybrid transmitter ultrasound system 200 can include B-mode, CD-mode, CEUS, and PW-mode.

The hybrid transmitter control module 206 can independently control operation of both a linear transmitter and a switching transmitter of the hybrid transmitter 202 based on ultrasound imaging modes of the hybrid transmitter ultrasound system 200. This is important as different ultrasound imaging modes can utilize different transmitter high voltages. Specifically, each ultrasound imaging mode can use a different transmit pulse at a different output level. This can require constant adjusting of the transmitter high voltage when using transmitters of only a single type. In turn, this can adversely impact the acquisition frame rate since the high voltage must settle to the new voltage before scanning. In order to overcome this issue, the hybrid transmit control module 206 can assign different transmitters, e.g. linear and switched transmitters of the hybrid transmitter 202, to operate in specific ultrasound imaging modes of the hybrid transmitter ultrasound system 200. Specifically, this can avoid the need to reprogram a high voltage supply of the hybrid transmitter 202. For example, B-mode can be assigned to use both a linear and switching transmitter, PW-mode can be assigned to use the switching transmitter only, CEUS can be assigned to use the linear transmitter only, and CD-mode can be assigned to use the linear transmitter only. As follows, higher frame rates can be achieved as opposed to when the hybrid transmitter control module 206 needs to reprogram transmitter high voltage supplies between modes. In various embodiments, the hybrid transmitter control module can control a switching transmitter and a linear transmitter of the hybrid transmitter 202 in an interleaved manner, e.g. that appear simultaneous to a user.

Additionally, the hybrid transmitter control module 206 can control the hybrid transmitter 202 based on a hybrid transmitter operation model associated with the hybrid transmitter 202. A hybrid transmitter operation model associated with the hybrid transmitter 202 can model, or otherwise predict, output of the hybrid transmitter 202 in response to specific input to the hybrid transmitter 202. More specifically, a hybrid transmitter operation model can predict output of the hybrid transmitter 202 operating in a specific ultrasound imaging mode in response to given input to the hybrid transmitter 202. Similarly, a hybrid transmitter operation model associated with the hybrid transmitter 202 can predict specific input to the hybrid transmitter 202 that will generate a desired output of the hybrid transmitter 202. More specifically, a hybrid transmitter operation model can predict specific input to the hybrid transmitter 202 that will generate desired output of the hybrid transmitter 202 when the hybrid transmitter 202 is operating in a specific ultrasound imaging mode.

A hybrid transmitter operation model associated with the hybrid transmitter 202 can be generated by simulating operation of one or more hybrid transmitters, potentially including the hybrid transmitter 202. Specifically, a hybrid transmitter operation model can be generated by simulating operation of the hybrid transmitter 202, e.g. using a SPICE simulation or a transducer model. Further, a hybrid transmitter operation model can be generated by simulating operation of hybrid transmitters different from the hybrid transmitter 202. In simulating operation of one or more hybrid transmitters, transmitter operation models can be simulated for each linear transmitter and switching transmitter in the one or more hybrid transmitters. Specifically, a linear transmitter operation model can be simulated for a linear transmitter of a hybrid transmitter and a switching transmitter operation model for a switching transmitter of the hybrid transmitter can be simulated. Subsequently, the simulated linear transmitter operation model and the simulated switching transmitter operation model can be combined to form a simulated hybrid transmitter operation model for the hybrid transmitter.

Further, the hybrid transmitter control module 206 can empirically determine a hybrid transmitter operation model by actually controlling the hybrid transmitter 202 to determine the hybrid transmitter operation model. Specifically, the hybrid transmitter control module 206 can control a linear transmitter of the hybrid transmitter 202 to empirically identify a linear transmitter operation model for the linear transmitter. Additionally, the hybrid transmitter control module 206 can control a switching transmitter of the hybrid transmitter 202 to empirically identify a switching transmitter operation model of the switching transmitter. Subsequently, the hybrid transmitter control module 206 can empirically determine a hybrid transmitter operation model by combining the empirically determined linear transmitter operation model and the empirically determined switching transmitter operation model.

In empirically determining a linear transmitter operation model for a linear transmitter of the hybrid transmitter 202, the hybrid transmitter control module 206 can turn off a switching transmitter of the hybrid transmitter 202. Subsequently, the hybrid transmitter control module 206 can input single impulse samples into the linear transmitter. The hybrid transmitter control module 206 can then measure hybrid transmitter output for driving the transducer load created in response to the single impulse samples input into the linear transmitter. Accordingly, the hybrid transmitter control module 206 can empirically generate a linear transmitter operation model for the linear transmitter based on the impulse samples input into the linear transmitter and the resultant transmitter output created in response to the impulse samples.

In empirically determining a switching transmitter operation model for a switching transmitter of the hybrid transmitter 202, the hybrid transmitter control module 206 can turn off a linear transmitter of the hybrid transmitter 202. Subsequently, the hybrid transmitter control module 206 can input single impulse samples into the switching transmitter. The hybrid transmitter control module 206 can then measure hybrid transmitter output for driving the transducer load created in response to the single impulse samples input into the switching transmitter. Accordingly, the hybrid transmitter control module 206 can empirically generate a switching transmitter operation model for the switching transmitter based on the impulse samples input into the switching transmitter and the transmitter output created in response to the impulse samples.

FIG. 3 shows an example hybrid transmitter configuration 300 of the hybrid transmitter 202 that is used to empirically create a hybrid transmitter operation model for the hybrid transmitter 202. Specifically, the hybrid transmitter configuration 300 can be controlled by the hybrid transmitter control module 206 to create a hybrid transmitter operation model for the hybrid transmitter 202.

As shown in the hybrid transmitter configuration 300 in FIG. 3, a linear transmitter model can be empirically determined by turning off the switching transmitter 302. The switching transmitters described herein, as shown in FIG. 3, can be formed by a trilevel transmitter. After the switching transmitter 302 is turned off, the hybrid transmitter control module 206 can input a single impulse sample to drive the D/A. Subsequently, the hybrid transmitter control module 206 can measure either the electrical output at the transducer load or the acoustic output of the transducer.

Likewise, the switching transmitter model can be empirically determined by turning off the linear transmitter 304. After the linear transmitter 304 is turned off, the hybrid transmitter control module 206 can input a single impulse sample to drive the switching transmitter 302. Subsequently, the hybrid transmitter control module 206 can measure either the electrical output at the transducer load or the acoustic output of the transducer. The hybrid transmitter control module 206 can then sum the output of the switching transmitter 302 when the linear transmitter 304 is turned off, with the output of the linear transmitter 304 when the switching transmitter 302 is turned off to generate a hybrid transmitter operation model 306 for the hybrid transmitter 202.

Figure 4A:
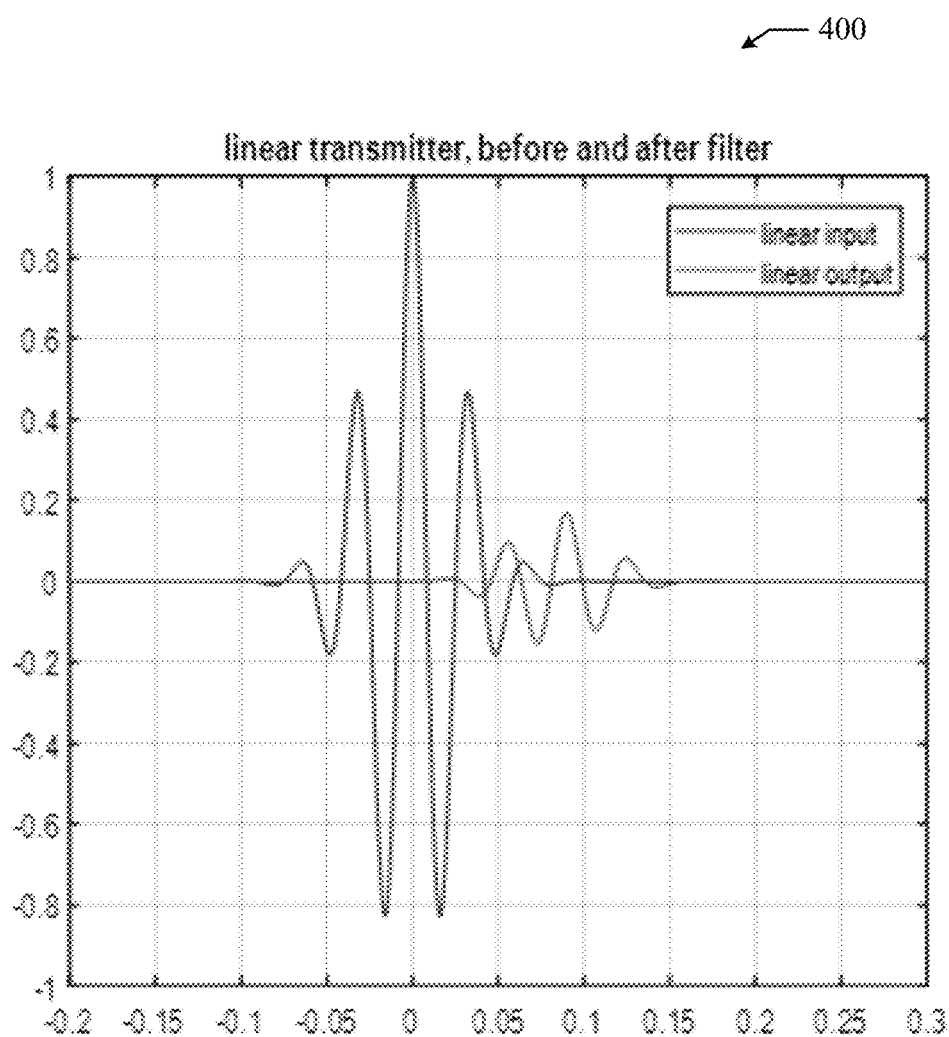
FIG. 4A shows a representation of liner transmitter output of linear transmitter used to generate a linear transmitter operation model.

FIG. 4A shows a representation 400 of liner transmitter output of the linear transmitter 304 used to generate a linear transmitter operation model. Specifically, FIG. 4A shows a representation 400 of the linear transmitter output both before and after the output is filtered. The linear transmit output shown in FIG. 4A can ultimately be used to generate a hybrid transmitter operation model for the hybrid transmitter 202.

Figure 4B:
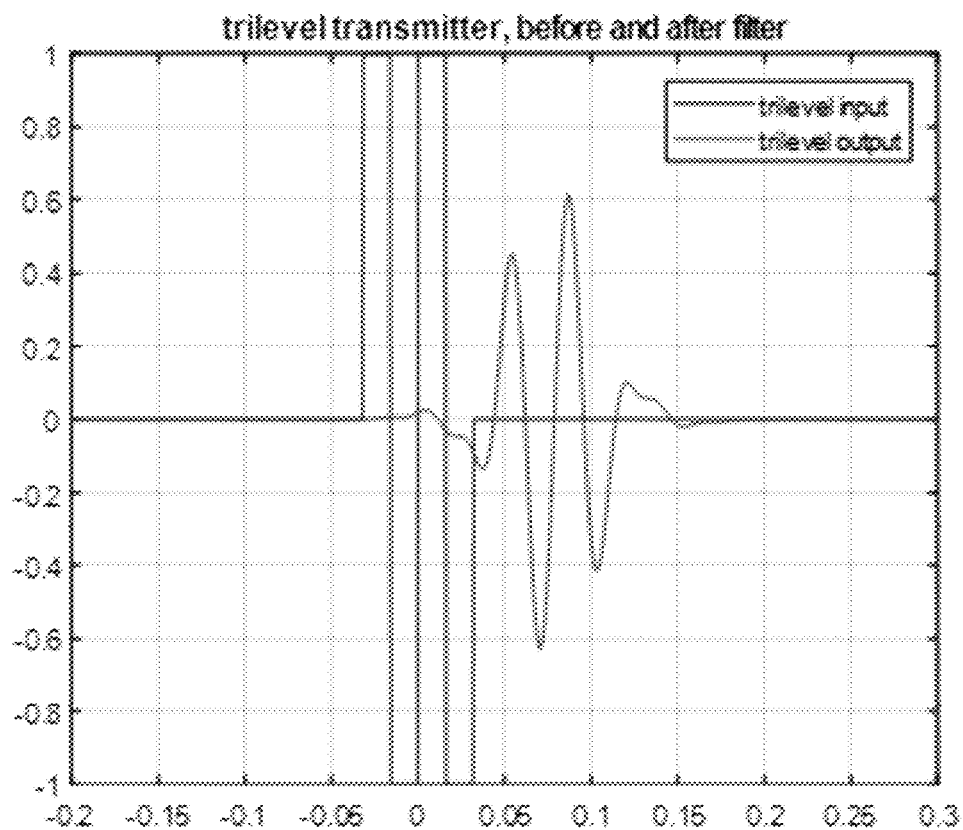
FIG. 4B shows a representation of switching transmitter output of a switching transmitter used to generate a switching transmitter operation model.

FIG. 4B shows a representation 402 of switching transmitter output of the switching transmitter 302 used to generate a switching transmitter operation model. Specifically, FIG. 4B shows a representation 402 of the switching transmitter output both before and after the output is filtered. The switching transmitter output shown in FIG. 4B can ultimately be used to generate a hybrid transmitter operation model for the hybrid transmitter 202.

Returning back to FIG. 2, after obtaining a hybrid transmitter operation model for the hybrid transmitter 202, the hybrid transmitter control module 206 can apply integer linear programming to control operation of the linear transmitter and the switching transmitter of the hybrid transmitter 202. Specifically, the hybrid transmitter control module 206 can apply integer linear programming to control operation of the hybrid transmitter 202 based on a hybrid transmitter operation model associated with the hybrid transmitter 202.

In applying integer linear programming to control the hybrid transmitter 202 based on a control model associated with the hybrid transmitter 202, the hybrid transmitter control module 206 can determine a desired output of the hybrid transmitter 202. Specifically, the hybrid transmitter control module 206 can determine desired characteristics of transmit ultrasound waves, corresponding to desired output of the hybrid transmitter 202, e.g. based on an ultrasound imaging mode of the hybrid transmitter 202. Accordingly, the hybrid transmitter control module 206 can use the control model to identify either or both linear transmitter input and switching transmitter input to apply to the hybrid transmitter 202 for generating the desired hybrid transmitter output. Subsequently, the hybrid transmitter control module 206 can actually control application of both the linear transmitter input and the switching transmitter input to the hybrid transmitter 202 to generate the desired hybrid transmitter output.

The following description provides more detail as to how the hybrid transmitter control module 206 can use mixed integer linear programming to derive optimal/desired/specific inputs for linear and switching transmitters to yield a desired target waveform/hybrid transmitter output for a transducer (electrical or acoustic). The linear transmitter input can be viewed as a continuous variable between −1 and 1 (high resolution D/A). Further, the switching transmitter input is a finite integer set; for example, a tri-level transmitter would be limited to the input set {−1, 0, 1}.

The hybrid transmitter control module 206 can be configured to solve Equations 1, 2, and 3, shown below, for $x_k$ and $n_k$ to derive optimal inputs, e.g. linear transmitter input and switching transmitter input, for the hybrid transmitter 202. Specifically, the hybrid transmitter control module 206 can solve Equations 1, 2, and 3 for $x_k$ and $n_k$ to minimize the error $\Sigma_k(y_k - \tilde{y}_k)^2$ to derive the optimal inputs to the hybrid transmitter:

$$\begin{bmatrix} \vdots & \vdots & \vdots \\ h_0(t) & h_0(t-\Delta) & h_0(t-2\Delta) \\ \vdots & \vdots & \vdots \end{bmatrix} \begin{bmatrix} x_0 \\ x_1 \\ x_2 \end{bmatrix} = \begin{bmatrix} \vdots \\ y_0(t) \\ \vdots \end{bmatrix} \quad \text{Equation 1}$$

$$\begin{bmatrix} \vdots & \vdots & \vdots \\ h_1(t) & h_1(t-\Delta) & h_1(t-2\Delta) \\ \vdots & \vdots & \vdots \end{bmatrix} \begin{bmatrix} n_0 \\ n_1 \\ n_2 \end{bmatrix} = \begin{bmatrix} \vdots \\ y_1(t) \\ \vdots \end{bmatrix} \quad \text{Equation 2}$$

$$\begin{bmatrix} \vdots \\ \tilde{y}(t) \\ \vdots \end{bmatrix} = \begin{bmatrix} \vdots \\ y_0(t) \\ \vdots \end{bmatrix} + \begin{bmatrix} \vdots \\ y_1(t) \\ \vdots \end{bmatrix} \quad \text{Equation 4}$$

Where $h_0$ is linear transmitter model single sample response;

$h_1$ is switching transmitter model single sample response;

$\hat{y}_k$ is hybrid transmitter model output;

$y_k$ is desired hybrid transmitter output;

$x_k$ is linear transmitter input; and $n_k$ is switching transmitter input.

By deriving specific hybrid transmitter input according to the previously described, the hybrid transmitter control module 206 can compensate for the analog responses of the linear transmitter, the switching transmitter, and the transducer to match the desired hybrid transmitter output with the actual output generated based on the specific input. Specifically, the hybrid transmitter control module 206 can compensate for these analog responses in order to match the desired hybrid transmitter output with the actual output generated based on specific hybrid transmitter input identified using a hybrid transmitter operation model.

Figure 5A:
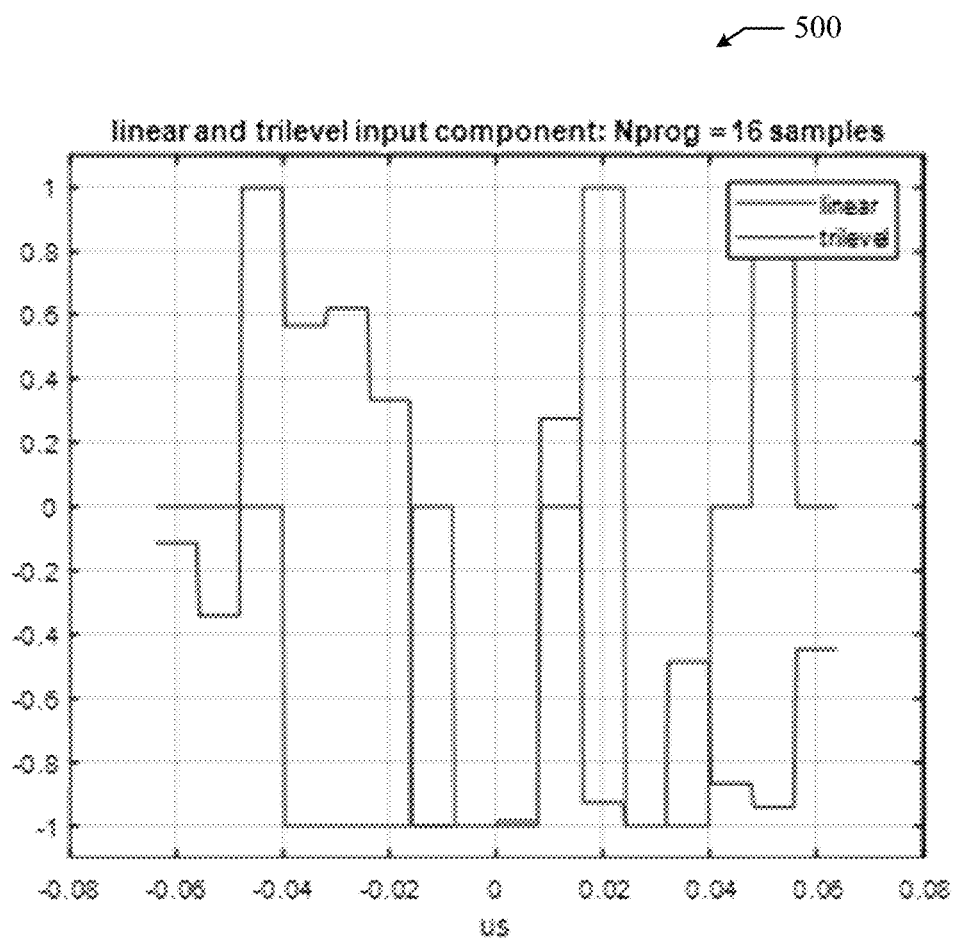
FIG. 5A shows optimal 16 sample input for a linear and switching transmitter of a hybrid transmitter to generate a 30 MHz, 2-cycle Gaussian pulse.
Figure 5B:
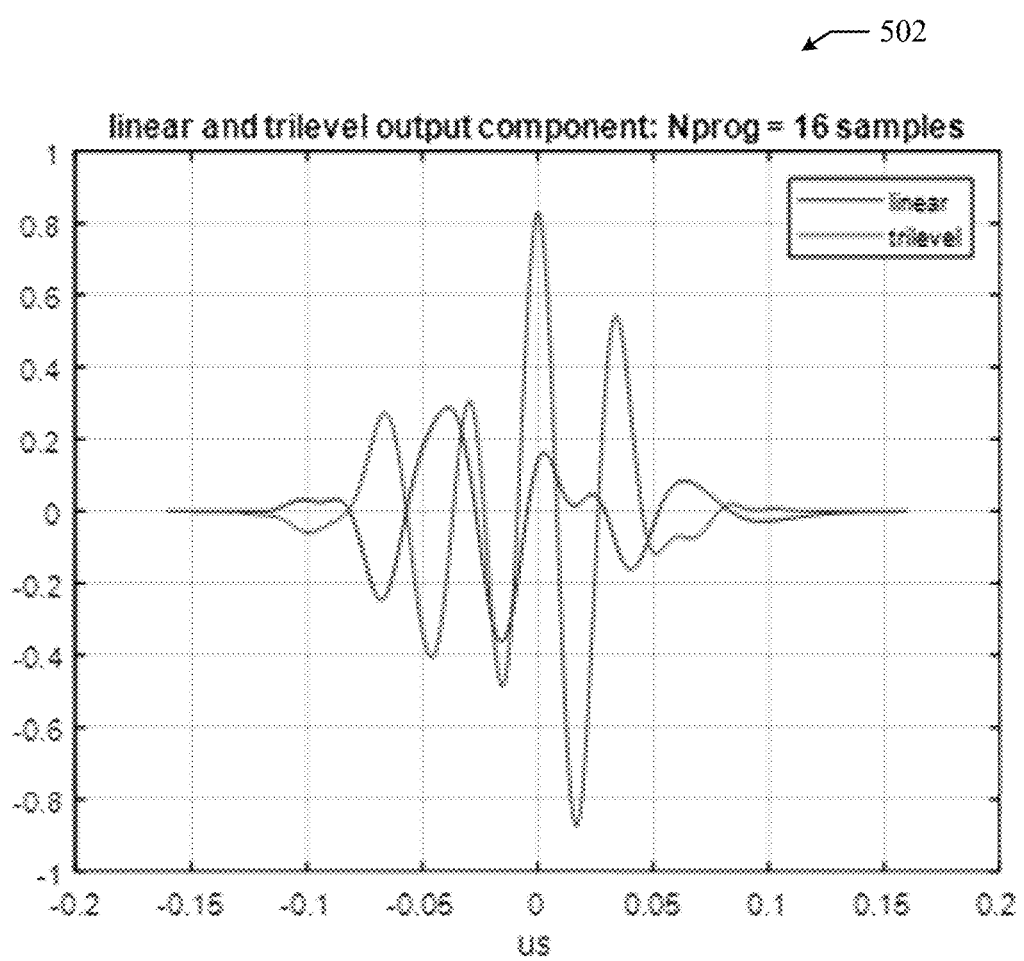
FIG. 5B shows outputs of the linear and switching transmitters of the hybrid transmitter to the optimal 16 sample input shown in FIG. 5A.
Figure 5C:
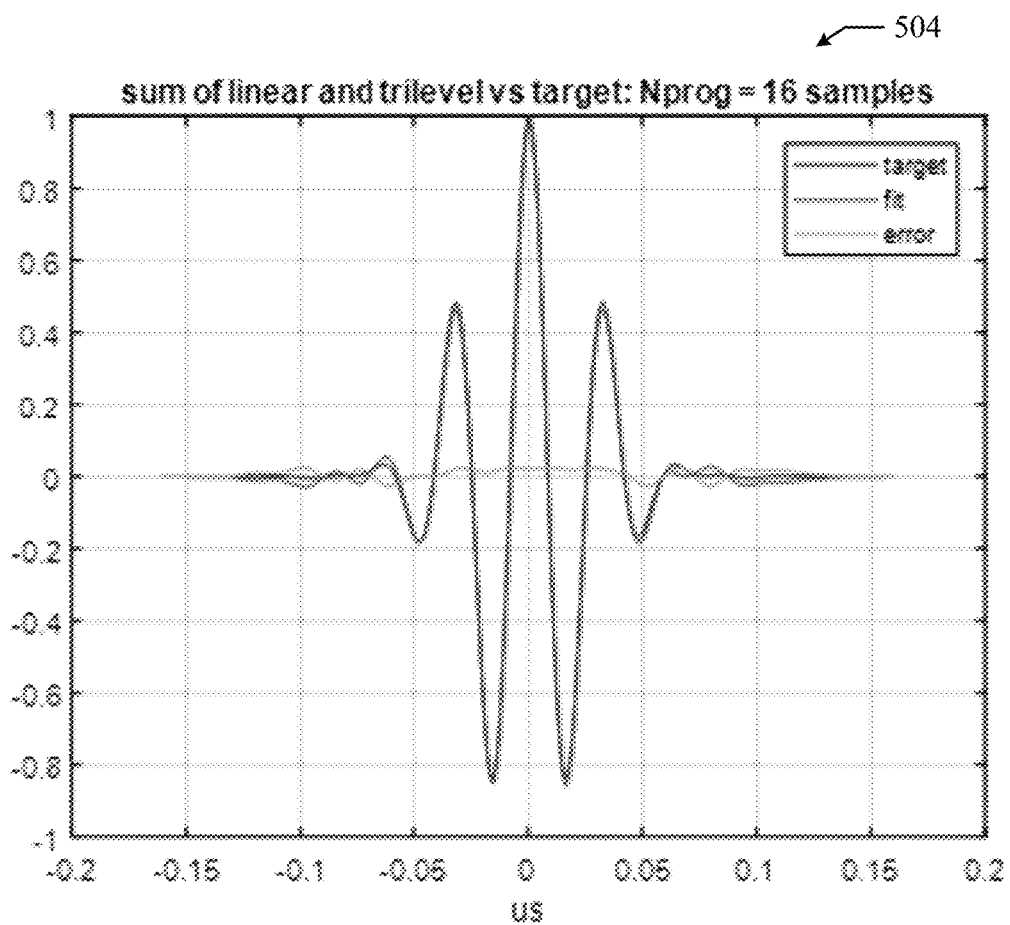
FIG. 5C shows final hybrid transmitter output of the hybrid transmitter in response to the 16 sample input compared to a desired output of the hybrid transmitter.

FIG. 5A shows optimal 16 sample input 500 for a linear and switching transmitter of the hybrid transmitter 202 to generate a 30 MHz, 2-cycle Gaussian pulse. FIG. 5B shows outputs 502 of the linear and switching transmitters of the hybrid transmitter 202 to the optimal 16 sample input 500 shown in FIG. 5A. FIG. 5C shows final hybrid transmitter output 504 of the hybrid transmitter 202 in response to the 16 sample input 500 compared to a desired output of the hybrid transmitter 202.

Figure 6A:
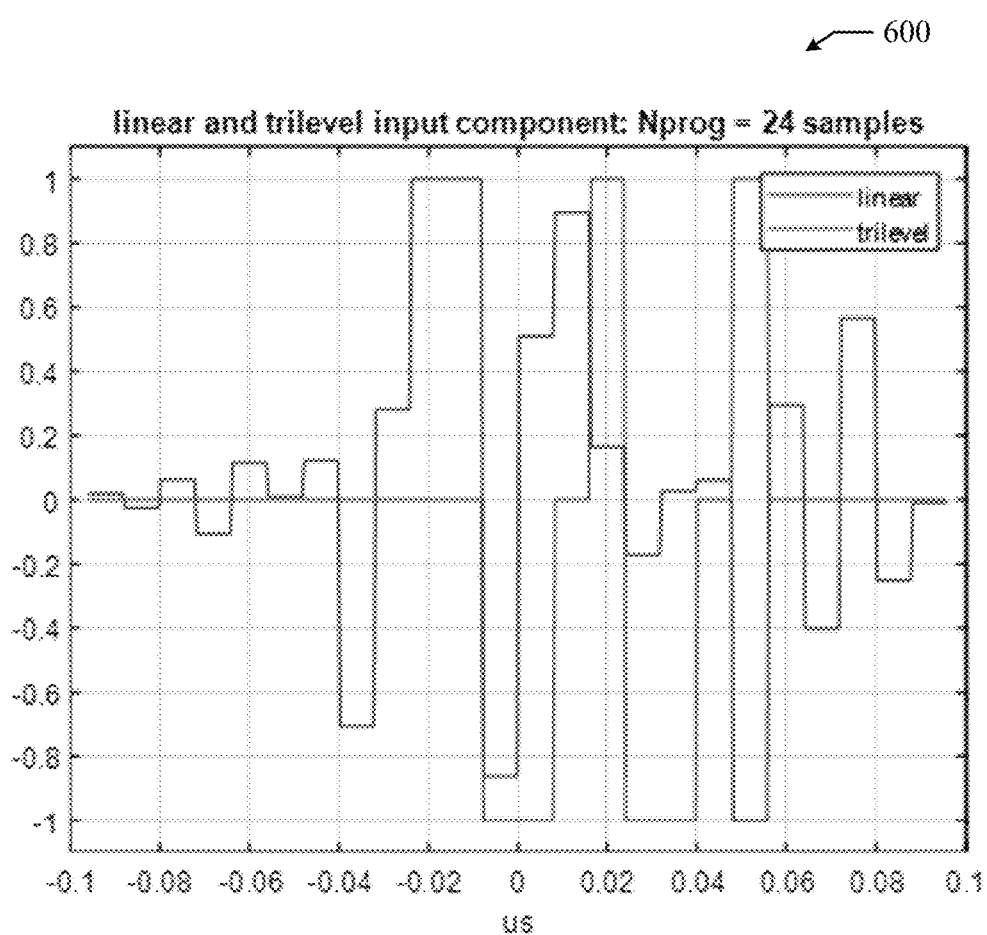
FIG. 6A shows optimal 24 sample input for a linear and switching transmitter of a hybrid transmitter.
Figure 6B:
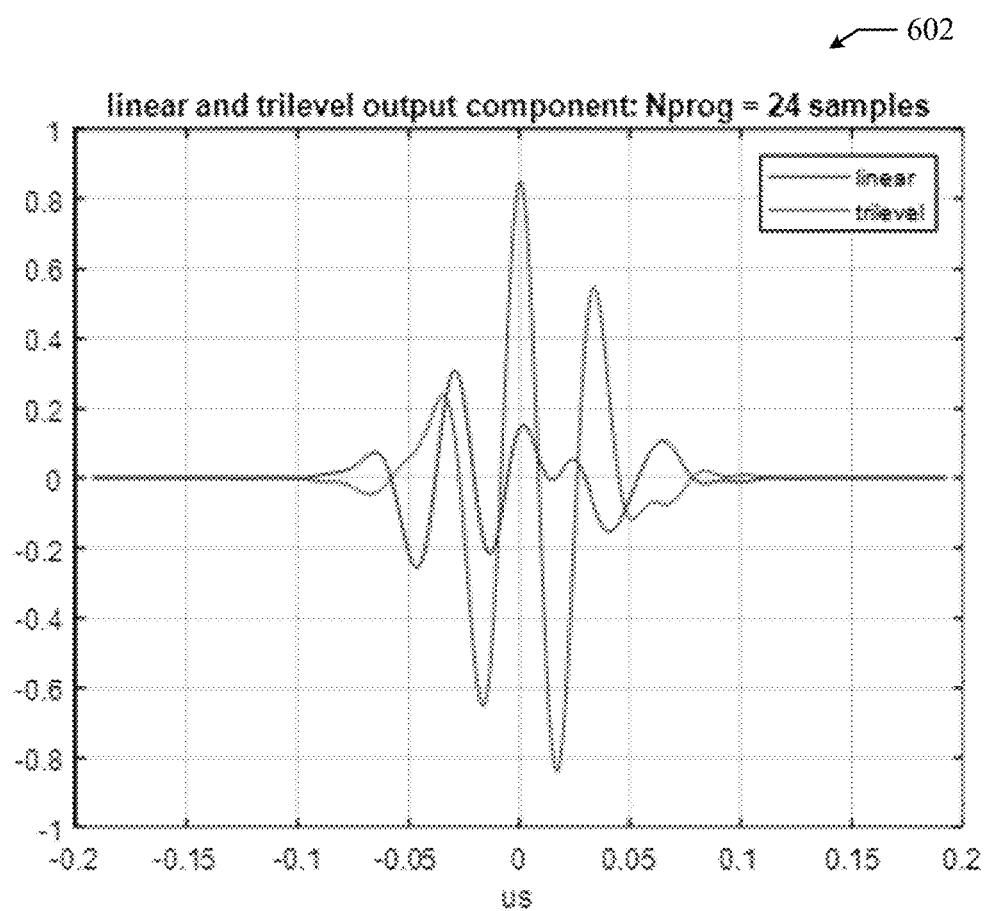
FIG. 6B shows outputs of the linear and switching transmitters of the hybrid transmitter to the optimal 24 sample input shown in FIG. 6A.
Figure 6C:
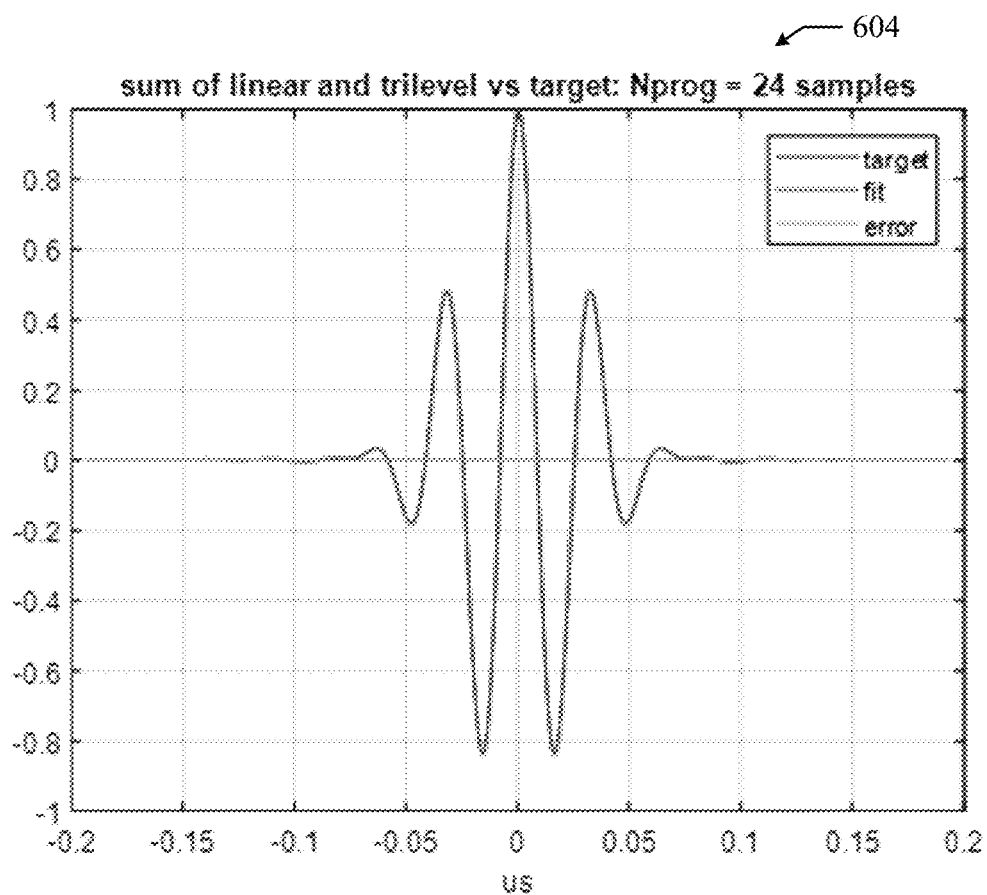
FIG. 6C shows final hybrid transmitter output of the hybrid transmitter in response to the 24 sample input compared to a desired output of the hybrid transmitter.

FIG. 6A shows optimal 24 sample input 600 for a linear and switching transmitter of the hybrid transmitter 202. FIG. 6B shows outputs 602 of the linear and switching transmitters of the hybrid transmitter 202 to the optimal 24 sample input 600 shown in FIG. 6A. FIG. 6C shows final hybrid transmitter output 604 of the hybrid transmitter 202 in response to the 24 sample input 600 compared to a desired output of the hybrid transmitter 202.

Figure 7A:
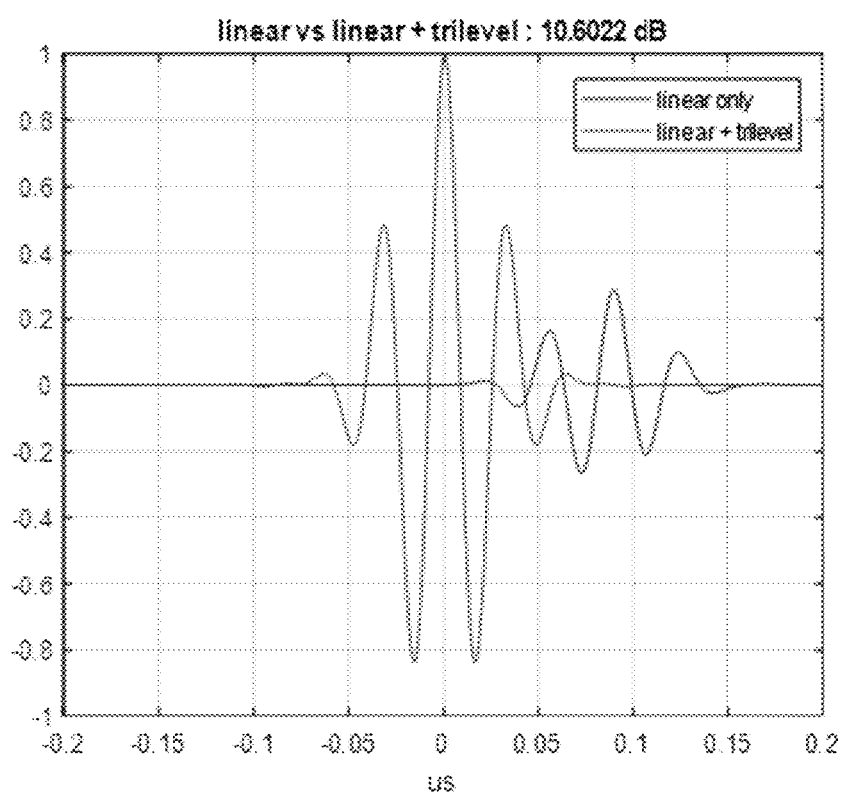
FIGS. 7A and 7B show comparisons of the 10 dB amplitude benefit of a hybrid transmitter over a linear transmitter in the time domain and the frequency domain.
Figure 7B:
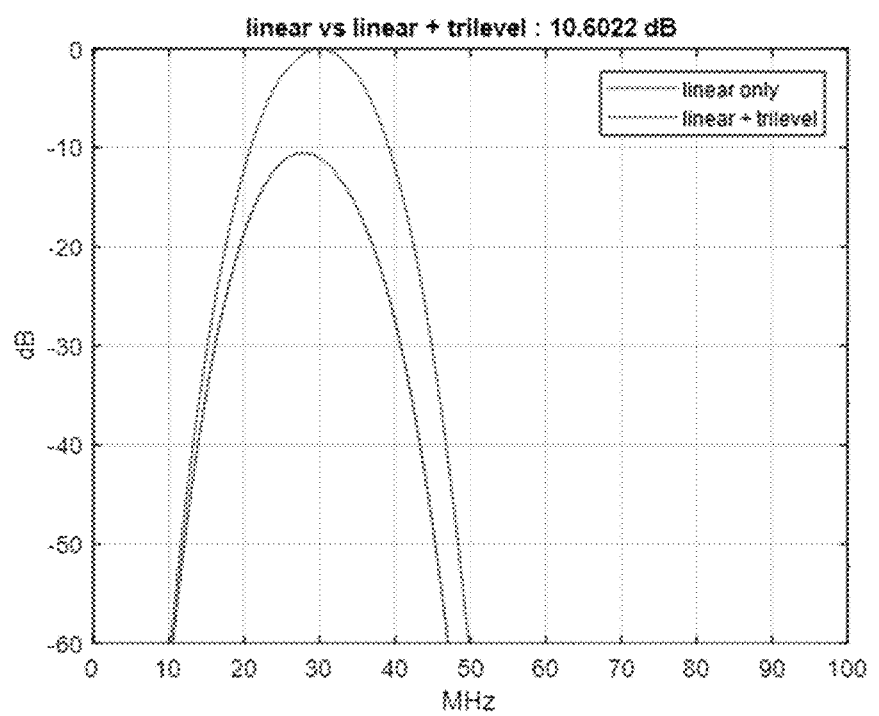

FIGS. 7A and 7B show comparisons of the 10 dB amplitude benefit of a hybrid transmitter over a linear transmitter in the time domain 700 and the frequency domain 702. It is noted that the hybrid transmitter output can match the desired input compensating for the analog responses of the linear transmitter, switching transmitter, and transducer.

Figure 8:
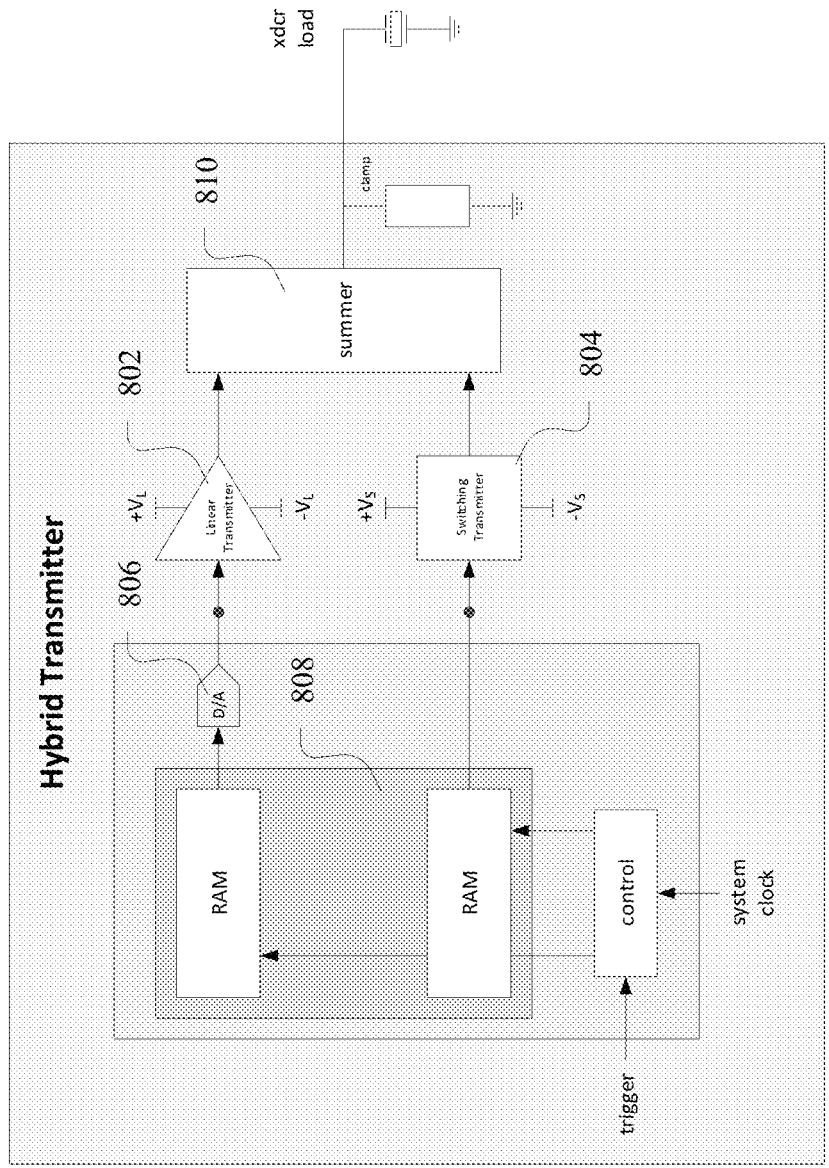
FIG. 8 shows an example topology of a hybrid transmitter.

FIG. 8 shows an example topology of a hybrid transmitter 800. The hybrid transmitter 800 can be an applicable hybrid transmitter implemented in an ultrasound system for transmitting ultrasound waves into a subject region, such as the hybrid transmitter 202. The hybrid transmitter 800 comprises a linear transmitter 802 and a switching transmitter 804. The linear transmitter 802 is driven from an N-bit D/A 806 which receives its input from a waveform RAM (N-bits) 808. The switching transmitter is driven using M-bits from the waveform RAM 808. In various embodiments, the M-bits from the waveform RAM 808 used to drive the switching transmitter 804 is less than the N-bits of waveform RAM 808 used to drive the linear transmitter 802. Further, the N-bits of waveform RAM 808 can include all of the bits of the waveform RAM 808. The waveform RAM 808 can be controlled, by the hybrid transmitter control module 206, to output an arbitrary output sequence (subject to the maximum length of the RAM 808) for use as input to the linear transmitter 802 and the switching transmitter 804. Alternatively, the hybrid transmitter control module 206 can loop repetitively over a portion of the waveform RAM 808 to provide input to the linear transmitter 802 and the switching transmitter 804. The loop portion can be prepended with a unique initial waveform sequence as well as appended with a unique terminating waveform sequence.

The outputs of the linear transmitter 802 and the switching transmitter 804 are summed, by a summer 810, prior to driving the transducer load. The summer 810 can be implemented through a transformer. An optional clamp of the transformer to ground (or short across the transformer) can be utilized to minimize the ringing after transmit pulsing of the hybrid transmitter terminates.

Figure 9A:
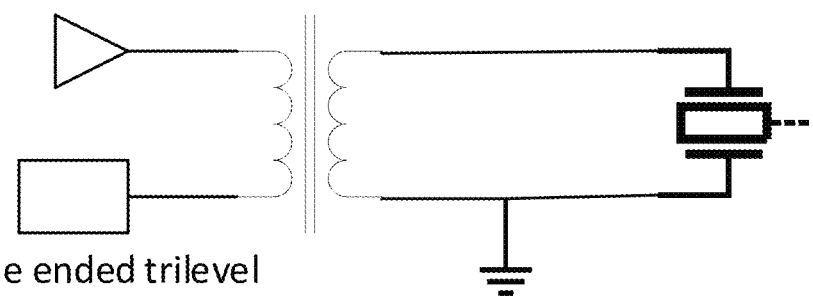
FIG. 9A shows a hybrid transmitter with a transformer operating as a summer to generate single ended hybrid transmitter output.

FIG. 9A shows a hybrid transmitter 900 with a transformer operating as a summer to generate single ended hybrid transmitter output. The hybrid transmitter 900 can be an applicable hybrid transmitter implemented in an ultrasound system for transmitting ultrasound waves into a subject region, such as the hybrid transmitter 202. The hybrid transmitter 900 includes a single ended linear transmitter configured to generate single ended linear transmitter output. The hybrid transmitter 900 also includes a single ended trilevel transmitter, operating as a switching transmitter, that is configured to generate single ended switching transmitter output. Additionally, the hybrid transmitter 900 includes a transformer acting as a summer to sum the single ended linear transmitter output and the single ended switching transmitter output to generate single ended hybrid transmitter output. Specifically, the summer can generate single ended hybrid transmitter output to drive a transducer load to generate ultrasound waves.

Figure 9B:
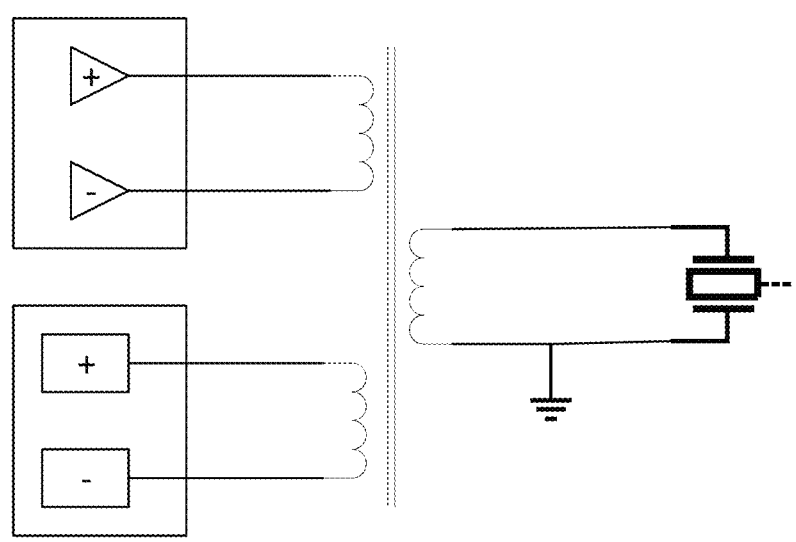
FIG. 9B shows a hybrid transmitter with a transformer operating as a summer to generate differential hybrid transmitter output. The FIG. 10 shows a hybrid transmitter with a switch.

FIG. 9B shows a hybrid transmitter 902 with a transformer operating as a summer to generate differential hybrid transmitter output. The hybrid transmitter 902 can be an applicable hybrid transmitter implemented in an ultrasound system for transmitting ultrasound waves into a subject region, such as the hybrid transmitter 202. The hybrid transmitter 902 includes a differential linear transmitter configured to generate differential linear transmitter output. The hybrid transmitter 902 also includes a differential trilevel transmitter, operating as a switching transmitter, that is configured to generate differential switching transmitter output. Additionally, the hybrid transmitter 902 includes a transformer acting as a summer to sum the differential linear transmitter output and the differential switching transmitter output to generate differential hybrid transmitter output. Specifically, the summer can generate differential hybrid transmitter output to drive a transducer load to generate ultrasound waves.

Figure 10:
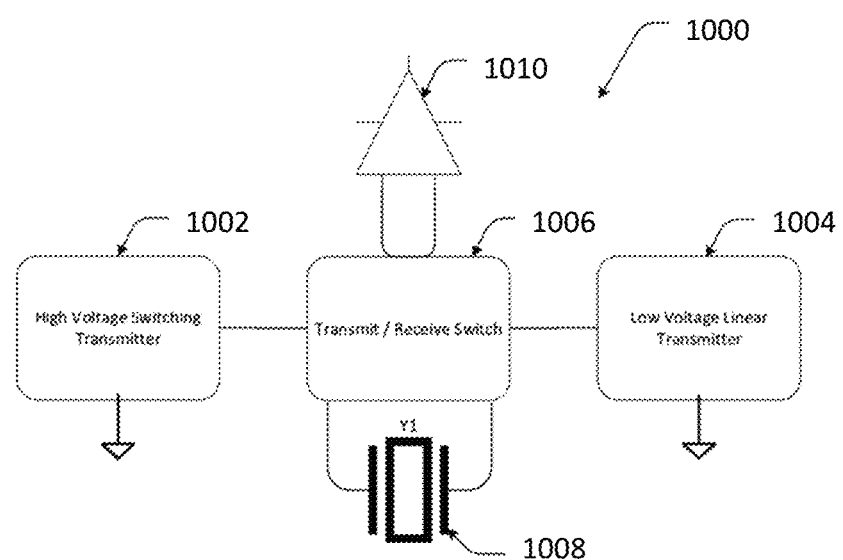

FIG. 10 shows a hybrid transmitter 1000 with a switch. The hybrid transmitter 1000 shown in FIG. 10 can be used instead of a transformer based hybrid transmitter, such as the hybrid transmitters 900 and 902 shown in FIGS. 9A and 9B. The hybrid transmitter 1000 includes a switching transmitter 1002 and a linear transmitter 1004. Further, the hybrid transmitter 1000 includes a transmit/receive switch 1006 coupled to the switching transmitter 1002 and the linear transmitter 1004. The switch 1006 is coupled to an oscillator 1008, e.g. crystal oscillator, for use by the switch 1006 in performing precise switching between the switching transmitter 1002 and the linear transmitter 1004. In operation, the switch 1006 functions to switch between output of the switching transmitter 1002 and the linear transmitter 1004 to drive the transducer load 1010.

Figure 11:
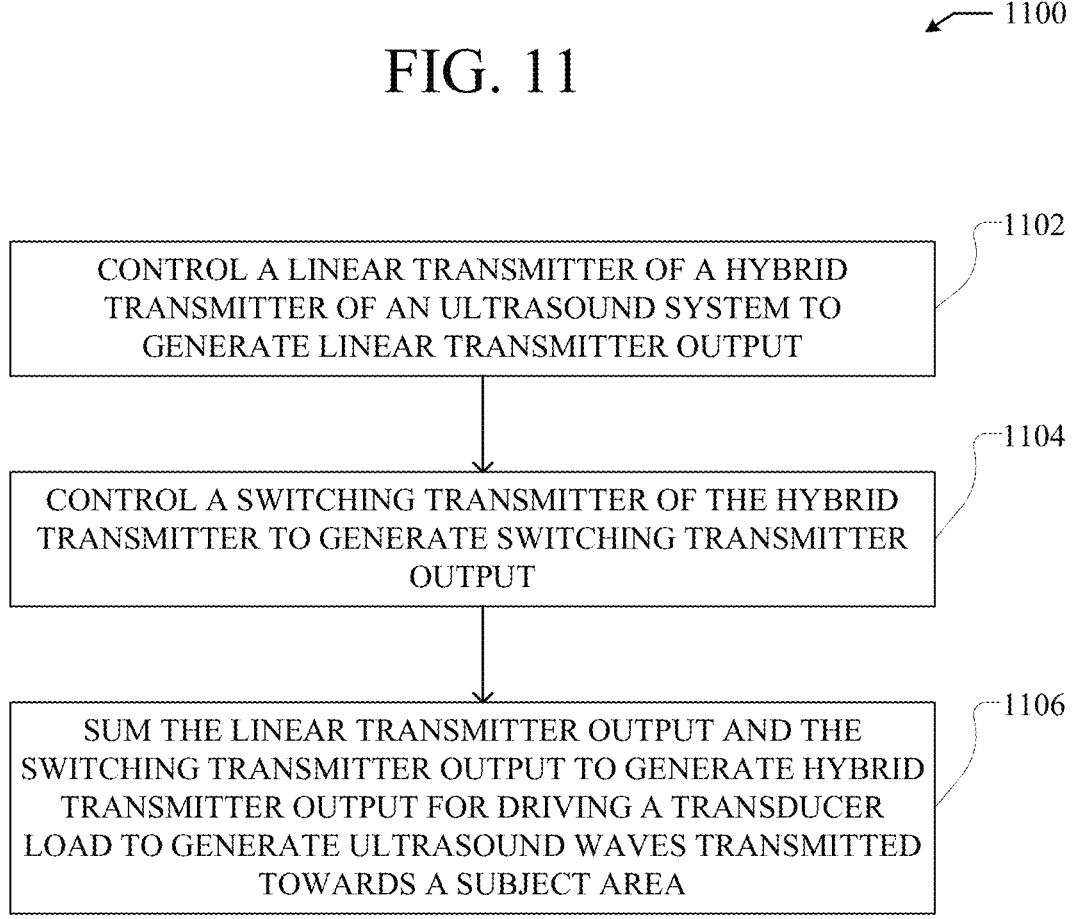
FIG. 11 is a flowchart of an example method of controlling a hybrid transmitter of an ultrasound system to transmit ultrasound waves towards a subject area.

FIG. 11 is a flowchart 1100 of an example method of controlling a hybrid transmitter of an ultrasound system to transmit ultrasound waves towards a subject area. The example method shown in FIG. 11, can be implemented using an applicable ultrasound system and an applicable hybrid transmitter, such as the systems and transmitters described herein.

At step 1102, a linear transmitter of a hybrid transmitter of an ultrasound system is controlled to generate linear transmitter output. The linear transmitter can be controlled by an applicable hybrid transmitter control module, such as the hybrid transmitter control module 206, to generate linear transmitter output. The linear transmitter can be configured to generate single ended output and controlled to create single ended linear transmitter output. Additionally, the linear transmitter can be configured to generate differential output and controlled to create differential linear transmitter output.

At step 1104, a switching transmitter of the hybrid transmitter of the ultrasound system is controlled to generate switching transmitter output. The switching transmitter can be controlled by an applicable hybrid transmitter control module, such as the hybrid transmitter control module 206, to generate switching transmitter output. The switching transmitter can be configured to generate single ended output and controlled to create single ended switching transmitter output. Additionally, the switching transmitter can be configured to generate differential output and controlled to create differential switching transmitter output.

At step 1106, a summer is controlled to sum the linear transmitter output and the switching transmitter output to generate hybrid transmitter output for driving a transducer load to generate ultrasound waves transmitted towards a subject area. The summer can be controlled to create either single ended hybrid transmitter output or differential hybrid transmitter output. The summer can be implemented through a transformer.

Figure 12:
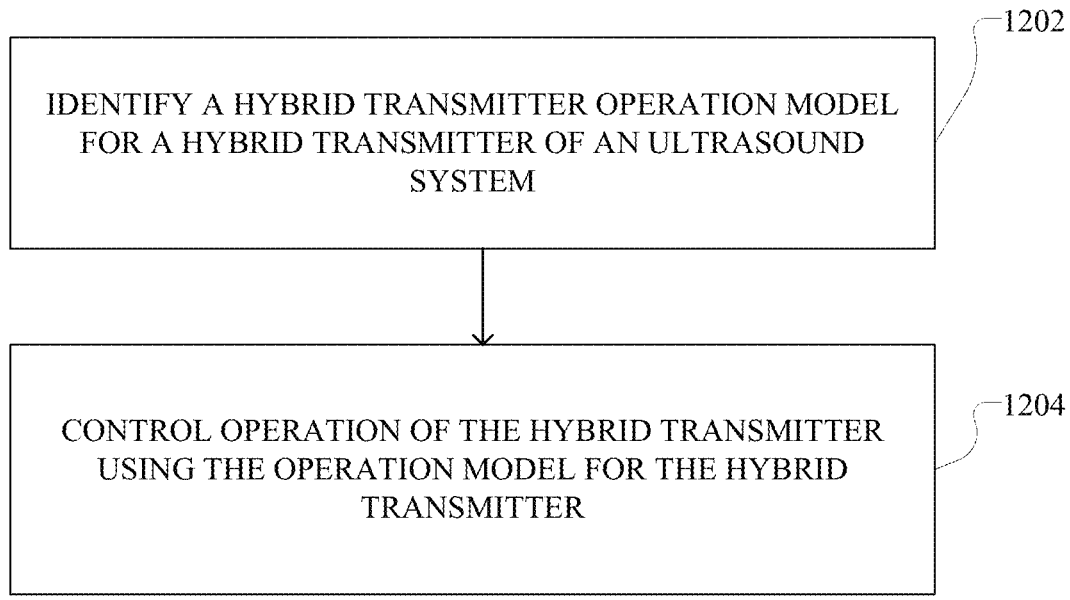
FIG. 12 is a flowchart of an example method of controlling a hybrid transmitter of an ultrasound system to transmit ultrasound waves towards a subject area using a transmitter operation model.

FIG. 12 is a flowchart 1200 of an example method of controlling a hybrid transmitter of an ultrasound system to transmit ultrasound waves towards a subject area using a transmitter operation model. The example method shown in FIG. 12, can be implemented using an applicable ultrasound system and an applicable hybrid transmitter, such as the systems and transmitters described herein.

At step 1202, a hybrid transmitter operation model for a hybrid transmitter of an ultrasound system is identified. The hybrid transmitter operation model can be identified by performing simulations of the hybrid transmitter or associated hybrid transmitters in operation. Additionally, the hybrid transmitter operation model can be identified empirically by actually operating the hybrid transmitter.

At step 1204, operation of the hybrid transmitter is controlled using the operation model for the hybrid transmitter. Specifically, either or both a linear transmitter and a switching transmitter of the hybrid transmitter can be controlled according to the operation model. More specifically, inputs to generate a desired hybrid transmitter output can be determined using the operation model. Subsequently the identified inputs can be provided to the linear transmitter and/or the switching transmitter of the hybrid transmitter to generate the desired hybrid transmitter output.

Figure 13:
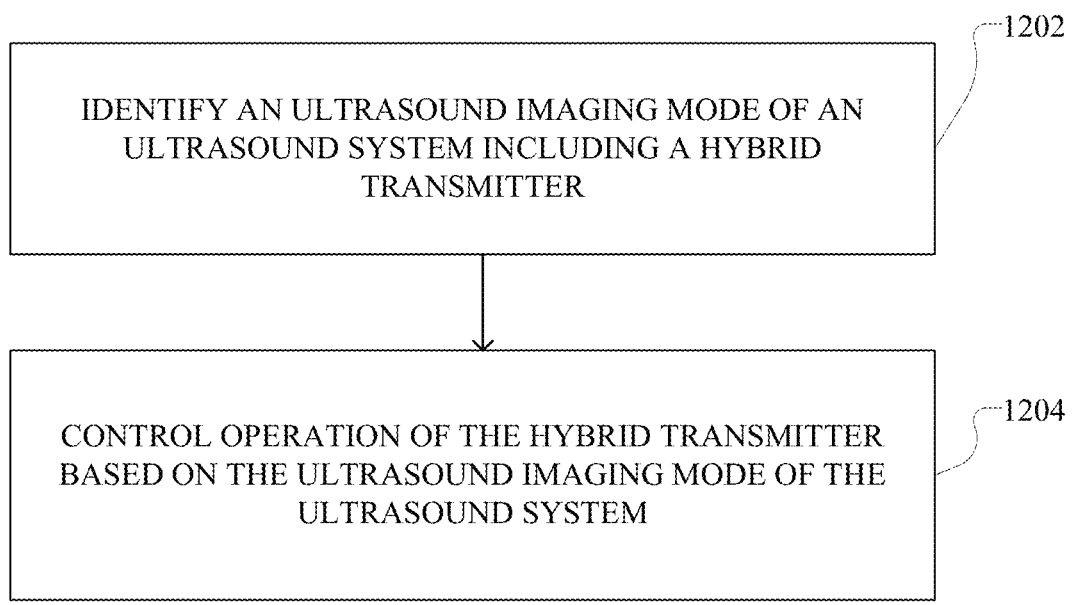
FIG. 13 is a flowchart of an example method of controlling a hybrid transmitter of an ultrasound system to transmit ultrasound waves towards a subject area based on an ultrasound imaging mode of the ultrasound system.

FIG. 13 is a flowchart 1300 of an example method of controlling a hybrid transmitter of an ultrasound system to transmit ultrasound waves towards a subject area based on an ultrasound imaging mode of the ultrasound system. The example method shown in FIG. 13, can be implemented using an applicable ultrasound system and an applicable hybrid transmitter, such as the systems and transmitters described herein.

At step 1302, an ultrasound imaging mode of an ultrasound system including a hybrid transmitter is identified. For example, the hybrid transmitter control module 206 can identify whether the ultrasound system is operating in B-mode, CD-mode, CEUS, or PW-mode. The hybrid transmitter can include both a linear transmitter and a switching transmitter.

At step 1304, operation of the hybrid transmitter is controlled based on the ultrasound imaging mode of the ultrasound system. Specifically, operation of either or both the linear transmitter and the switching transmitter of the hybrid transmitter can be controlled based on the ultrasound imaging mode. For example, when the ultrasound system is operating in PW-mode, the switching transmitter of the hybrid transmitter can be controlled to transmit ultrasound waves for operation in PW-mode.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. An ultrasound system for imaging a patient comprising:
an ultrasound transducer to transmit ultrasound waves toward a subject area of a patient;
a hybrid transmitter comprising:
a controller;
a waveform memory coupled to the controller to store a representation of an output waveform sequence supplied by the controller;

a transformer having an output coupled to drive the ultrasound transducer;

an N-bit digital-to-analog converter having an input coupled to receive N-bits of the waveform memory;

a linear transmitter having an input coupled to the N-bit digital-to-analog converter and an output coupled to the transformer, the linear transmitter to generate linear transmitter output; and a switching transmitter having an input coupled to receive M-bits of the waveform memory and an output coupled to the transformer, the switching transmitter to generate switching transmitter output, wherein the switching transmitter is a trilevel transmitter;

wherein the transformer sums the linear transmitter output and the switching transmitter output to generate hybrid transmitter output for driving the ultrasound transducer to generate the ultrasound waves transmitted towards the subject area; and an ultrasound receiver configured to receive one or more ultrasound waves from the subject area in response to the ultrasound waves transmitted toward the subject area for generating one or more ultrasound images of the subject area.

2. The ultrasound system of claim 1, wherein the M-bits of the waveform memory used by the switching transmitter to generate the switching transmitter output is less than the N-bits of the waveform memory used by the linear transmitter to generate the linear transmitter output.

3. The ultrasound system of claim 1, wherein:
the linear transmitter is a single ended linear transmitter configured to generate single ended linear transmitter output;
the switching transmitter is a single ended trilevel transmitter configured to generate single ended switching transmitter output; and
the transformer is configured to generate, from the single ended linear transmitter output and the single ended switching transmitter output, single ended hybrid transmitter output as part of the hybrid transmitter output for driving the ultrasound transducer.

4. The ultrasound system of claim 1, wherein:
the linear transmitter is a differential linear transmitter configured to generate differential linear transmitter output;
the switching transmitter is a differential trilevel transmitter configured to generate differential switching transmitter output; and
the transformer is configured to generate, from the differential linear transmitter output and the differential switching transmitter output, differential hybrid transmitter output as part of the hybrid transmitter output for driving the ultrasound transducer.

5. The ultrasound system of claim 1, wherein the transformer is shorted to ground.

6. The ultrasound system of claim 1, wherein the controller is to control operation of the linear transmitter and the switching transmitter of the hybrid transmitter to generate the hybrid transmitter output using a hybrid transmitter operation model.

7. The ultrasound system of claim 6, wherein the hybrid transmitter operation model is generated using a simulation of one or more hybrid transmitters including the hybrid transmitter.

8. The ultrasound system of claim 6, wherein the controller is further configured to generate the hybrid transmitter operation model by:

empirically identifying a linear transmitter operation model of the linear transmitter based on operation of the linear transmitter to generate the linear transmitter output;

empirically identifying a switching transmitter operation model of the switching transmitter based on operation of the switching transmitter to generate the switching transmitter output; and determining the hybrid transmitter operation model using the linear transmitter operation model and the switching transmitter operation model.

9. The ultrasound system of claim 8, wherein the controller is further configured to identify the linear transmitter operation model by:
turning off the switching transmitter;
inputting one or more single impulse samples to the linear transmitter; and
measuring the hybrid transmitter output for driving the ultrasound transducer load to generate the linear transmitter operation model.

10. The ultrasound system of claim 8, wherein the controller is further configured to identify the switching transmitter operation model by:
turning off the linear transmitter;
inputting one or more single impulse samples to the switching transmitter; and
measuring the hybrid transmitter output for driving the ultrasound transducer to generate the switching transmitter operation model.

11. The ultrasound system of claim 6, wherein the controller is further configured to apply integer linear programming based on the hybrid transmitter operation model to control operation of the linear transmitter and the switching transmitter to generate the hybrid transmitter output using the hybrid transmitter operation model.

12. The ultrasound system of claim 11, wherein the controller is further configured to apply the integer linear programming based on the hybrid transmitter operation model to determine linear transmitter input and switching transmitter input to apply for generating a desired hybrid transmitter output of the hybrid transmitter.

13. The ultrasound system of claim 12, wherein the controller is further configured to compensate for analog responses of the linear transmitter, the switching transmitter, and the ultrasound transducer to match the desired hybrid transmitter output with the hybrid transmitter output generated using the linear transmitter input and the switching transmitter input determined based on the hybrid transmitter operation model.

14. The ultrasound system of claim 6, wherein the controller is further configured to control operation of the linear transmitter and the switching transmitter based on an ultrasound imaging mode of the ultrasound system.

15. A method for transmitting ultrasound waves into a subject area of a patient from an ultrasound imaging system comprising an ultrasound transducer to transmit ultrasound waves toward a subject area of a patient and a hybrid transmitter comprising:
a controller;
a waveform memory coupled to the controller to store a representation of an output waveform sequence supplied by the controller;
a transformer having an output coupled to drive the ultrasound transducer;
an N-bit digital-to-analog converter having an input coupled to receive N bits of the waveform memory;

a linear transmitter having an input coupled to the N-bit digital-to-analog converter and an output coupled to the transformer, the linear transmitter to generate linear transmitter output; and a switching transmitter having an input coupled to receive M bits of the waveform memory and an output coupled to the transformer, the switching transmitter to generate switching transmitter output, wherein the switching transmitter is a trilevel transmitter, the method comprising:

controlling the linear transmitter of a hybrid transmitter to generate linear transmitter output;

controlling the switching transmitter of the hybrid transmitter to generate switching transmitter output, wherein the switching transmitter is a trilevel transmitter; and summing the linear transmitter output and the switching transmitter output using the transformer to generate hybrid transmitter output for driving an ultrasound transducer to generate ultrasound waves transmitted towards a subject area.

16. A method for controlling operation of a hybrid transmitter of an ultrasound imaging system comprising an ultrasound transducer to transmit ultrasound waves toward a subject area of a patient and a hybrid transmitter comprising:

a controller;

a waveform memory coupled to the controller to store a representation of an output waveform sequence supplied by the controller;

a transformer having an output coupled to drive the ultrasound transducer;

an N-bit digital-to-analog converter having an input coupled to receive N bits of the waveform memory;

a linear transmitter having an input coupled to the N-bit digital-to-analog converter and an output coupled to the transformer, the linear transmitter to generate linear transmitter output; and a switching transmitter having an input coupled to receive M bits of the waveform memory and an output coupled to the transformer, the switching transmitter to generate switching transmitter output, wherein the switching transmitter is a trilevel transmitter, the method comprising:

identifying a hybrid transmitter operation model for the hybrid transmitter of the ultrasound imaging system; and controlling operation of the linear transmitter and the switching transmitter by the controller according to the hybrid transmitter operation model to generate desired hybrid transmitter output for driving the ultrasound transducer.

17. A method for controlling operation of a hybrid transmitter of an ultrasound imaging system comprising an ultrasound transducer to transmit ultrasound waves toward a subject area of a patient and a hybrid transmitter comprising:

a controller;

a waveform memory coupled to the controller to store a representation of an output waveform sequence supplied by the controller;

a transformer having an output coupled to drive the ultrasound transducer;

an N-bit digital-to-analog converter having an input coupled to receive N bits of the waveform memory;

a linear transmitter having an input coupled to the N-bit digital-to-analog converter and an output coupled to the transformer, the linear transmitter to generate linear transmitter output; and a switching transmitter having an input coupled to receive M bits of the waveform memory and an output coupled to the transformer, the switching transmitter to generate switching transmitter output, wherein the switching transmitter is a trilevel transmitter, the method comprising:

identifying an ultrasound imaging mode of the ultrasound imaging system; and controlling operation of the linear transmitter and the switching transmitter according to the ultrasound imaging mode of the ultrasound imaging system.

* * * * *